US007558224B1

(12) United States Patent
Surazski et al.

(10) Patent No.: US 7,558,224 B1
(45) Date of Patent: *Jul. 7, 2009

(54) MANAGEMENT OF PACKET-BASED AUDIO DEVICES WITHIN ACOUSTIC SPACES

(75) Inventors: Luke K. Surazski, San Jose, CA (US); Pascal H. Huart, Nice (FR)

(73) Assignee: Cisco Technology, Inc., San Jose, CA (US)

( * ) Notice: Subject to any disclaimer, the term of this patent is extended or adjusted under 35 U.S.C. 154(b) by 1226 days.

This patent is subject to a terminal disclaimer.

(21) Appl. No.: 10/630,515

(22) Filed: Jul. 29, 2003

(51) Int. Cl.
*H04B 3/20* (2006.01)

(52) U.S. Cl. .................. 370/289; 370/260; 370/352; 704/220; 709/231

(58) Field of Classification Search ............ 370/260, 370/352, 389, 433, 465, 505, 289; 709/231; 704/220
See application file for complete search history.

(56) References Cited

U.S. PATENT DOCUMENTS

| | | | |
|---|---|---|---|
| 5,790,173 A * | 8/1998 | Strauss et al. ............... 725/114 |
| 6,466,550 B1 | 10/2002 | Foster et al. ................. 370/261 |
| 6,522,647 B1 * | 2/2003 | Czajkowski et al. ......... 370/356 |
| 6,721,282 B2 * | 4/2004 | Motley ......................... 370/252 |
| 6,728,239 B1 | 4/2004 | Kung et al. .................. 370/352 |
| 6,754,210 B1 | 6/2004 | Ofek ............................ 370/389 |
| 6,788,688 B2 | 9/2004 | Trebes, Jr. ................... 370/395 |
| 6,801,604 B2 | 10/2004 | Maes et al. ................. 379/88.17 |
| 6,816,469 B1 | 11/2004 | Kung et al. .................. 370/260 |
| 6,961,346 B1 * | 11/2005 | Michalewicz et al. ....... 370/465 |
| 6,973,074 B1 * | 12/2005 | Maranhao .................... 370/352 |
| 7,110,416 B2 * | 9/2006 | Selin .......................... 370/433 |
| 7,280,650 B2 * | 10/2007 | Miao ....................... 379/202.01 |
| 7,319,703 B2 * | 1/2008 | Lakaniemi et al. .......... 370/505 |
| 7,359,979 B2 * | 4/2008 | Gentle et al. ................ 709/231 |
| 2002/0031114 A1 * | 3/2002 | Terry et al. .................. 370/352 |
| 2002/0124097 A1 * | 9/2002 | Isely et al. ................... 709/231 |
| 2004/0156397 A1 * | 8/2004 | Heikkinen et al. .......... 370/516 |
| 2004/0190508 A1 * | 9/2004 | Houghton et al. ........... 370/389 |

* cited by examiner

*Primary Examiner*—Gerald Gauthier
(74) *Attorney, Agent, or Firm*—Baker Botts L.L.P.

(57) ABSTRACT

A system includes multiple packet-based communication devices that support audio output and other suitable functionality and an acoustic space management device that manages these devices to provide telephony services within acoustic spaces. These devices can coordinate their actions to provide audio services, such as conferencing, paging, broadcasting, and other appropriate audio services.

29 Claims, 2 Drawing Sheets

MANAGEMENT OF PACKET-BASED AUDIO DEVICES WITHIN ACOUSTIC SPACES

TECHNICAL FIELD OF THE INVENTION

The present invention relates generally to audio systems and, more particularly, to management of packet-based audio devices within acoustic spaces.

BACKGROUND OF THE INVENTION

Recent technological advances have brought about revolutionary new techniques for delivering telephony services. One such advance, the proliferation of packet-based networks, has enabled the development and deployment of packet-based telephony devices. These devices present a host of opportunities for advanced services, yet also present challenges not present in traditional circuit-switched telephones.

SUMMARY OF THE INVENTION

In accordance with the present invention, techniques for management of packet-based audio devices within acoustic spaces are provided. According to particular embodiments, these techniques enable a group of individual packet-based telephony devices within an acoustic space to operate in coordination to provide audio input and output. In particular, these techniques can enable multiple packet-based telephony devices within an acoustic space to provide conferencing services, paging services, and other coordinated audio services.

According to a particular embodiment, a method for coordinating operation of packet-based audio devices discovers a plurality of packet-based audio devices within an acoustic space and initializes the packet-based audio devices to participate in a communication session. The method generates an output stream that includes packets each having digitally encoded audio. The method calculates a time for play out of a selected one of the packets, provides the output stream to the packet-based audio devices, and commands each of the packet-based audio devices to output the audio from the selected packet at the calculated time.

Embodiments of the invention provide various technical advantages. These techniques can leverage upon the proliferation of packet-based telephony devices to provide additional audio services. These additional services may include conferencing services provided by multiple packet-based telephony endpoints within an acoustic space. For example, by appropriately managing multiple packet-based telephones within a conference room, this system enables these devices to provide effective conferencing services. Similar management of packet-based endpoints can provide other services, such as paging and broadcast services. By adding additional functionality to the packet-based endpoints, systems can provide services such as conferencing more effectively and efficiently and at lower costs.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
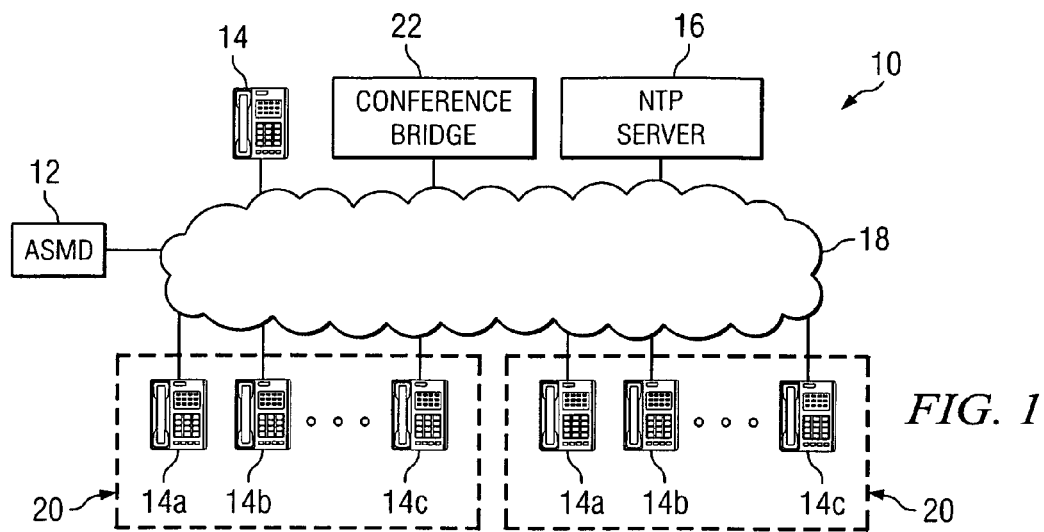
FIG. 1 illustrates a communication system that includes multiple packet-based telephony devices and a acoustic space management device for controlling coordination of these devices to provide audio services.

FIG. 1 illustrates a communication system, indicated generally at 10, that includes an acoustic space management (ASM) device 12, multiple packet-based communication devices 14, a network time protocol (NTP) server 16, and a conference bridge 22 all interconnected by a communication network 18. Within system 10, communication devices 14 are arranged within one or more acoustic spaces 20. In general, system 10 provides for media communications between one or more communication devices 14 and, using ASM device 12, enables coordinated communications between communication devices 14. More specifically, ASM device 12 provides management of communication devices 14 within acoustic spaces 20 to provide coordinated media communication services. For example, ASM device 12 may manage multiple independent communication devices 14 within a selected acoustic space 20 such that these communication devices 14 jointly provide audio communication services for users within acoustic space 20.

Each acoustic space 20 represents a physical zone in which sounds may be effectively transmitted by the propagation of sound waves. For example, an acoustic space 20 may be a conference room. Acoustic space 20 may include one or more communication devices 14. However, with only one communication device 14 within an acoustic space, ASM device 12 need not provide coordination of multiple communication device 14. Thus, while the embodiment illustrated includes a number of communication devices 14, only those communication devices 14 representing equipment within a shared physical zone are grouped and labeled as acoustic spaces 20.

Each communication device 14 represents communications equipment capable of transmitting and receiving media in packet-based form. That is, communication devices 14 communicate media that is parsed into separate packages of data that may, for example, each be separately addressed and delivered. For example, communication devices 14 may include Internet protocol (IP), telephones, appropriately enabled computers, packet-based mobile phones, and other suitable packet-based communications equipment. Communication devices 14 are interconnected and communicate using network 18. Network 18 represents any suitable collection and arrangement of components that support the transmission of packets. For example, network 18 may include local area networks, wide area networks, portions of the telephony infrastructure, portions of global communications networks such as the Internet, wireless networks, and any other suitable communications components.

NTP server 16 provides for synchronization of network elements to a standard time. For example, through communications with ASM device 12, NTP server 16 can synchronize ASM device 12 to a centralized clock. NTP server 16 may provide these synchronization services to any elements, including communication devices 14. This enables multiple elements with varying clocks and time measurements to synchronize with a centralized time. However, while NTP server 16 is illustrated as a single element within system 10, NTP server 16 may be implemented by any suitable combination and arrangement of centralized and/or distributed components.

Conference bridge 22 supports communication sessions interconnecting any number of communication devices, such as communication devices 14 and/or any other suitable communications equipment. For example, conference bridge 22 may link with multiple conference participants, receive input streams from these participants, and provide conference media output streams to these participants.

ASM device 12 provides for management of multiple independent communication devices 14 within one or more acoustic spaces 20 to support various media communication services. For example, during communication sessions, ASM device 12 can coordinate and manage actions of communication devices 14 to provide services using multiple communication devices 14 located within a common acoustic space 20. According to particular embodiments, ASM device 12 can provide advanced conferencing services by coordinating actions of multiple communication devices 14 within acoustic space 20. To provide these conferencing services, ASM device 12 may support any number of appropriate features. According to particular embodiments, ASM device 12 provides for management of information regarding communication devices 14, coordination of output from communication devices 14, handling of input from communication devices 14, acting as a single point of contact for communication devices 14, and responding to network conditions effecting communication devices 14.

To enable coordination of communication devices 14, ASM device 12 may manage a variety of information regarding communication devices 14. Such information may include, for example, membership of communication devices 14 within acoustic spaces 20, device configurations, device types, and any other appropriate information associated with communication devices 14. According to particular embodiments, ASM device 12 discovers the membership of communication devices 14 within acoustic spaces 20 using either an automatic and/or manual discovery process. According to particular embodiments, an administrator may manually identify communication devices 14 within common acoustic spaces 20 and configure centralized and/or distributed databases to reflect membership of communication devices 14 within acoustic spaces. This technique, while potentially effective for static or slowly changing configurations, may not lend itself well to fluctuating configurations, such as networks that include mobile communication devices 14.

As an additional or alternative discovery technique, ASM device 12 may support automated discovery of communication devices 14 within common acoustic spaces 20. As an example, ASM device 12 could implement a tone-based detection scheme, in which each communication device 14, in turn, generates a tone, while all other communication devices 14 report on receipt of the tone. Based upon the levels at which communication devices 14 detect a tone, ASM device 12 can potentially identify communication devices 14 within common acoustic spaces. However, while a particular example for automatic discovery is provided, system 10 contemplates ASM device 12 using any suitable techniques for commanding and monitoring communication devices 14 to determine membership of communication devices 14 within acoustic spaces 20.

As an additional or alternative discovery technique, ASM device 12 may implement a dynamic discovery scheme in which membership of communication devices 14 within acoustic spaces 20 can be determined during a communication session. For example, during a conference call in which ASM device 12 acts as a conference bridge, ASM device 12 may run a cross-correlation algorithm on input streams received from participants in the conference. This may permit ASM device 12 to identify those communication devices 14 operating within common acoustic spaces 20. According to particular embodiments, ASM device 12 may need to run the cross-correlation only at particular points during a conference, such as when a new active speaker is selected, when a new potential active speaker is available following the selection of a new active speaker, or when a new device enters the conference. Therefore, as shown by these various techniques and examples, system 10 contemplates ASM device 12 using any suitable techniques and operations to discover communication devices 14 within common acoustic spaces 20. Using this and other information regarding communication devices 14, ASM device 12 can coordinate the actions of these communication devices 14 to provide media services.

One aspect of coordinating actions of communication devices 14 involves coordinating the output of communication devices 14 within a common acoustic space 20. To coordinate output, ASM device 12 may manage communication devices 14 to synchronize play out of audio in time and to level the volume of output from communication devices 14. To synchronize play out, ASM device 12 instructs communication devices 14 when to output media contained in packets. According to particular embodiments, ASM device 12 determines algorithmic constraints of communication devices 14, calculates a time delay based on these constraints, and then commands communication devices 14 to output audio from a particular packet at a specific time based on the calculated time delay. Communication devices 14 may then use a synchronized time determined from NTP server 16 to determine the precise time to output audio from the packet, while taking into account algorithmic delays particular to the specific communication device 14 providing the output.

For example, consider ASM device 12 coordinating output of communication devices 14 labeled a, b, and c. ASM device 12 may first determine algorithmic constraints of devices a, b, and c. These constraints may specify time delays introduced by the particular decoding and processing algorithms for each communication device 14. ASM device 12 may then calculate a time delay that is satisfiable by some or all of these communication devices 14. For example, ASM device 12 may select a time delay greater than or equal to the greatest time constraint among devices a, b, and c. ASM device 12 can then command devices a, b, and c to output a particular packet at a specific time based upon the calculated time delay. For example, ASM device 12 may stream a sequence of audio packets containing audio from a communication session. ASM device 12 can identify one of these packets, such as by sequence number, and specify a time for outputting the audio from the packet. Each of devices a, b, and c then take into account their particular time delays to ensure that the audio from the identified packet is output at the time specified. Because each packet may include a known "slice" of audio, ASM device 12 may provide timing commands to communication devices 14 only at selected points of a communication session. Communication devices 14 can then calculate appropriate times for outputting audio from subsequent packets by implication.

As noted, ASM device 12 may also ensure level play out volume of communication devices 14 within acoustic space 20. System 10 contemplates ASM device 12 and communication devices 14 using any suitable techniques for accomplishing this leveling of output volume. According to particular embodiments, ASM device 12 may enable one communication device 14 within acoustic space 20 to control the volume level of all communication devices 14 within acoustic space 20. Alternatively or in addition, ASM device 12 may control volume levels based upon input, such as user volume settings, from one or more communication devices 14. However, to ensure that the output levels remain fairly consistent, system 10 contemplates communication devices 14 using any suitable automatic or manual volume setting techniques. For example, compliant communication devices 14 may support a standard set of volume levels. Alternatively or in addition, communication devices 14 may support volume discovery techniques, such as detection of the decibel level of a tone. Thus, as illustrated by these examples, system 10 contemplates ASM device 12 and communication devices 14 providing any suitable coordination to enable setting of consistent volume levels among communication devices 14 within acoustic space 20.

ASM device 12 also handles input received from communication devices 14 within acoustic space 20. Thus during a communication session, ASM device 12 may receive packet-based audio input streams from multiple communication devices 14. These multiple input streams may each include various "versions" of the same audio events. For example, the input streams of devices a, b, and c may each reflect the speech of a speaker within acoustic space 20. Mixing all of these versions together may create a cluttered and incomprehensible audio stream. Specifically, this may result in echoes within the conference media streams. Therefore, according to particular embodiments, ASM device 12 selects one of the input media streams from communication devices 14 within acoustic space 20 as a primary input media stream. ASM device 12 may make the selection based upon criteria such as signal strength, signal clarity, and/or other appropriate criteria. Thus, for example, ASM device 12 may simply select the input media stream having the loudest input. However, system 10 contemplates ASM device 12 using any suitable algorithms for selecting and combining one or more of the input streams received from communication devices 14 within acoustic space 20. ASM device 12 may then supply the resulting mixed or selected media stream to other participants of the communication session. For example, ASM device 12 may select the strongest input signal and communicate packets from this selected input stream to a remote participant of the communication session.

According to particular embodiments, ASM device 12 will not feed input streams from acoustic space 20 back into acoustic space 20. Thus ASM device 12 will only communicate the selected input media from acoustic space 20 to participants other than those communication devices 14 within acoustic space 20. This permits feedback from adversely affecting quality of audio output within acoustic space 20. For the output stream provided to communication devices 14 within acoustic space 20, ASM device 12 may sum input from all other participants of the communication session. Therefore, ASM device 12 can tailor the output media stream provided to particular participants of a communication session.

ASM device 12 may also act as a single "point of contact" for information destined to acoustic space 20 during a communication session. For example, consider a communication session between acoustic space 20 and a remote participant. during the session, the remote participant may supply a single media stream to ASM device 12 using any suitable communications protocols. ASM device 12 can then supply this media stream to communication devices 14 in packet based form using unicast, multicast, or other suitable delivery mechanisms. ASM device 12 may also, as previously discussed, supply timing and other appropriate commands to enable coordination of the output from each communication device 14.

ASM device 12 may also support monitoring of network conditions and response to events such as network degradation. According to particular embodiments, ASM device 12 monitors network conditions based upon messages received from communication devices 14. For example, during a communication session, each participating communication device 14 may report network conditions, such as significant packet losses, to ASM device 12. In circumstances where selected communication devices 14 are experiencing significant packet loss, algorithms such as packet loss concealment algorithms operating within these communication devices 14 may result in uneven output from communication devices 14 within acoustic space 20. To combat these types of disparities between output of communication devices 14 within a single acoustic space 20, ASM device 12 may command communication devices 14 to alter their operation. According to particular embodiments, ASM device 12 may monitor for communication devices 14 within a particular acoustic space 20 that are experiencing significant packet loss and, in response to such a condition, may command some or all of communication devices 14 within that acoustic space 20 to make remedial responses. For example, some or all communication devices 14 may support acoustic echo cancellation using either full duplex or half duplex modes. In the event of network degradation, ASM device 12 may instruct some or all communication devices 14 to switch their acoustic echo cancellation schemes to half duplex operation. ASM device 12 can then switch communication devices 14 back into full duplex operation upon detecting a reduction in the packet loss.

During operation, ASM device 12 supports communication sessions between communication devices 14 within a single acoustic space 20 and one or more remote participants. Each of these remote participants may be any individual or group of communications devices. Moreover, one or more other participants may also be groups of communication devices 14 within other acoustic spaces 20 that can be managed by ASM device 12 or other controlling equipment. To support communication sessions with more than one remote participant, ASM device 12 may link to and utilize services provided by conference bridge 22. However, ASM device 12 may additionally or alternatively incorporate some or all of the functions of conference bridge 22.

During a communication session, ASM device 12 receives input streams from each communication device 14 within acoustic space 20. Each of these input streams received from communication devices 14 include audio coded into digital format and communicated using packets. Using the input streams from participating communication devices 14, ASM device 12 generates an output stream for communication to other participants of the communication session. During a communication session, ASM device 12 may also receive input streams, using any appropriate communications protocols, from remote participants of the session. ASM device 12 forwards information from these input streams in output streams communicated to communication devices 14. For output streams communicated to communication devices 14, ASM device 12 encodes audio in digital format and communicates this audio within packets. As previously noted, ASM device 12 may tailor each output stream according to the recipient. For example, for output streams destined to communication devices 14 within acoustic space 20, ASM device 12 may include only audio from session participants that are not within acoustic space 20.

During a communication session, ASM device 12 also coordinates the actions of communication devices 14 within acoustic space 20. As previously discussed, this may include actions such as synchronizing play out in time, leveling volume among communication devices 14, handling input from communication devices 14, and other appropriate tasks. According to particular embodiments, ASM device 12 uses real time protocol (RTP) and/or RTP control protocol (RTCP) mechanisms to provide commands to communication devices 14. For example, either embedded within packets of an output stream or by providing separate signaling packets, ASM device 12 can provide commands to communication devices 14 using extensions to RTP or RTCP mechanisms. However, while ASM device 12 may use techniques such as these for relaying commands and information to and from communication devices 14, system 10 contemplates ASM device 12 using any suitable mechanisms for communicating with and coordinating actions among communication devices 14.

Thus using techniques such as those described, ASM device 12 can manage and coordinate actions of multiple devices 12 within an acoustic space 20 to provide conference room functionality within acoustic space 20 during a communication session. However, while described with respect to sessions between acoustic space 20 and remote participants, it should be understood that the concepts detailed may be applied to systems providing services such as broadcasting, paging, or other suitable applications.

Figure 2:
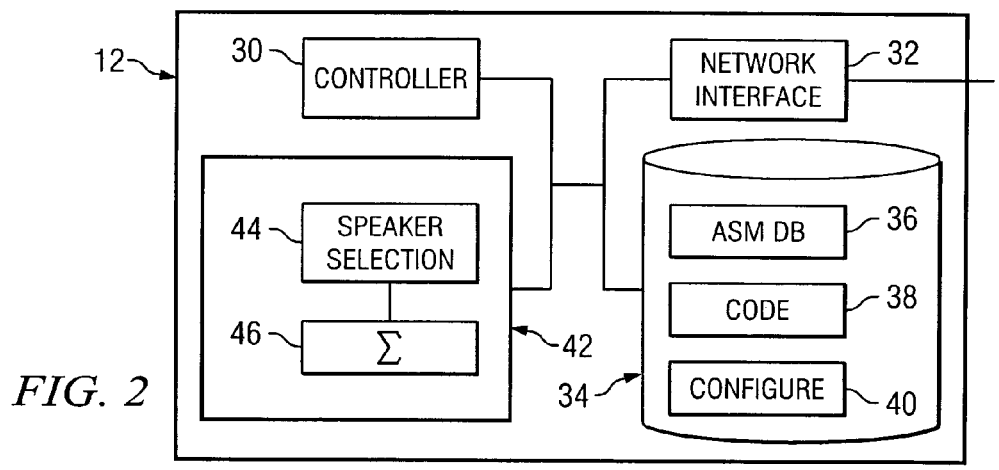
FIG. 2 is a block diagram illustrating exemplary components for the acoustic space management device.

FIG. 2 is a block diagram illustrating exemplary functional elements for ASM device 12, which includes a controller 30, a network interface 32, and a memory 34. In the embodiment illustrated, memory 34 includes an acoustic space management database 36, code 38, and configuration information 40. In general, the elements of ASM device 12 operate to provide management and coordination of communication devices 14 within a single acoustic space 20. In particular, ASM device 12 may provide for coordinated output of audio by multiple independent communication devices 14 acting within a single acoustic space 20. As discussed, this can provide for conferencing, paging, broadcasts, and other suitable audio play out services using any number of packet-based audio communication devices.

Controller 30 controls the operation of ASM device 12 to provide services such as the management and coordination of remote communication devices 14. Controller 30 may be implemented using any suitable combination of hardware and logic arranged in any suitable configuration. Network interface 32 provides a link between ASM device 12 and other communications equipment within system 10. For example, network interface 32 may provide for packet-based communications with communication devices 14 as well as for communications with other equipment using other suitable protocols. Thus, interface 32 may support packet-based communication protocols along with any other suitable protocols.

Memory 34 represents any suitable local and/or remote data storage apparatus. In the embodiment illustrated, memory 34 includes acoustic space management database 36, code 38, and configuration information 40. Acoustic space management database 36 maintains information reflecting the distribution of communication devices 14 within acoustic spaces 20. For example, database 36 may list information, such as network addresses and equipment types, for each communication device 14 and reflect the membership of that communication device 14 within a particular acoustic space 20. ASM device 12 may use information within database 36 to configure system 10, establish communication sessions, and coordinate actions of communication devices 14 to provide enhanced audio services. Code 38 represents any suitable software, executable files, and/or other appropriate logic for use in controlling the operation of ASM device 12. For example, code 38 may include logic for execution by controller 30. Configuration information 40 includes settings, selections, and other appropriate configurations for use in establishing and controlling the operation of ASM device 12.

To provide handling of media, including audio, ASM device 12 includes media module 42. According to particular embodiments, ASM device 12 may support advanced conferencing features in addition to supporting the coordination of multiple communication devices 14 within an acoustic space 20. For example, ASM device 12 may support features such as speaker selection, media mixing, and other suitable conferencing features. Thus while FIG. 1 illustrates system 10 as including a separate conference bridge 22, some or all conferencing features may be supported by ASM device 12. Thus the following description may detail ASM device 12 as including selected conferencing features that may not be necessary for managing communication devices 14 within common acoustic spaces 20.

In the embodiment illustrated, media module 42 includes a speaker selection module 44, and a media summation module 46. Speaker selection module 44 operates to select one or more input streams for mixing into an output stream during a communication session. For example, during a communication session, ASM device 12 may receive input media streams from all participants of a conference. Speaker selection module 44 may select subsets of these input media streams to mix into one or more conference audio streams. Moreover, as previously discussed, ASM device 12 may receive input media streams from some or all communication devices 14 within a single acoustic space 20. To prevent echoes, speaker selection module 44 can select only one of these input media streams to mix into a conference media stream. Based upon the selected input streams, media summation module 46 combines the selected streams into one or more output streams for delivery to participants of the communication session. As previously discussed, ASM device 12 may supply different output streams to various participants. Therefore, media summation module 46 may provide mixing of selected input streams into multiple output streams.

While the preceding description and the embodiment illustrated focus on a particular example of ASM device 12 that includes specific elements providing particular functions, system 10 contemplates ASM device 12 having any suitable combination and arrangement of elements providing services to support coordination of multiple devices within an acoustic space. Thus, the functionalities performed by the particular elements illustrated may be distributed or combined as appropriate, and the functionalities of some or all of these elements may be implemented by logic encoded in media. Moreover, while illustrated as a separate element of system 10, the functions provided by ASM device 12 may be separated or combined as appropriate among any suitable elements. For example, some or all of the functionality of the ASM device 12 may be distributed within communication devices 14 or conference bridge 22.

Figure 3:
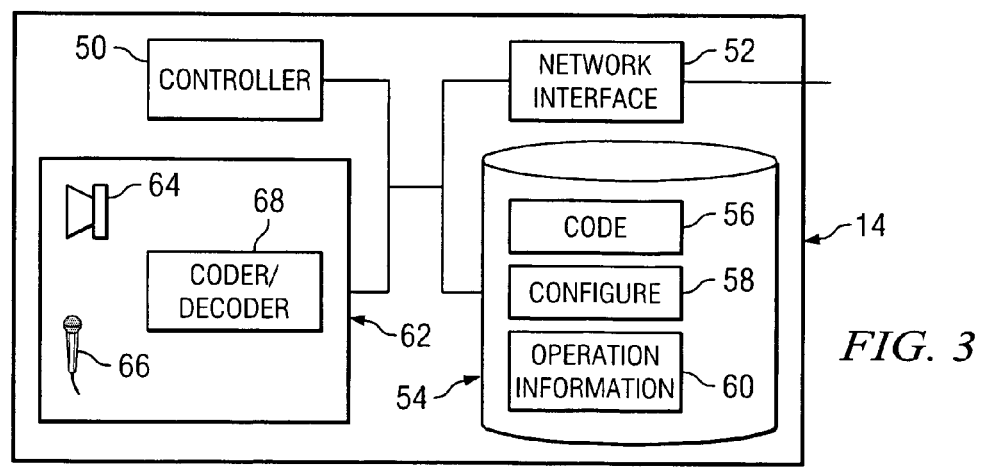
FIG. 3 is a block diagram illustrating exemplary functional components for a packet-based telephony device in the system.

FIG. 3 is a block diagram illustrating exemplary functional elements for communication device 14, which includes a controller 50, a network interface 52, a memory 54, and a user interface 62. In the embodiment illustrated, memory 54 includes code 56, configuration information 58, and operational information 60. User interface 62 includes a speaker 64, a microphone 66, and a coder/decoder 68. In general, communication device 14 provides audio services to one or more users and supports packet-based communications of audio and/or other suitable media using network interface 52. In particular, communication device 14 is enabled to cooperate with other communication devices 14 to provide for enhanced audio services. For example, communication device 14 may cooperate with other communication devices 14 within a single acoustic space 20 to provide services, such as conferencing, paging, and broadcasting.

Controller 50 controls the operation of communication device 14 to provide packet-based audio communication services and to support coordination of the operations of communication device 14 with other communication devices 14. Controller 50 may be implemented using any suitable combination of hardware and logic arranged in any suitable configuration. Network interface 52 provides a link between communication device 14 and other communications equipment within system 10. Specifically, network interface 52 supports packet-based communications and potentially other communication protocols. During operation, network interface 52 may receive packets of information and depacketize this information for use by other components of communication device 14. For example, network interface 52 may receive audio packets and depacketize the audio from these packets for output by user interface 62. Similarly, network interface 52 may receive digitized audio from user interface 62 and packetize this digitized audio for communication to other elements, such as ASM device 12.

Memory 54 represents any suitable local and/or remote data storage apparatus. In the embodiment illustrated, memory 54 includes code 56, configuration information 58, and operational information 60. Code 56 represents any suitable software, executable files, and/or other appropriate logic for use in controlling the operation of communication device 14. For example, code 56 may include logic for execution by controller 50. Configuration information 58 includes settings, selections, and other appropriate configurations for use during the operation of communication device 14. For example, configuration information 58 may include user identity information, user settings, preferences, network addresses, and other appropriate information. Operational information 60 includes information detailing the operational characteristics of communication device 14. For example, operational information 60 may include characteristics of algorithms used by user interface module 62, synchronized time settings, and other appropriate data for use during operation. This information may enable communication device 14 to provide audio output from packets at or near a precise time specified by ASM device 12.

User interface module 62 provides for interaction with one or more users of communication device 14. In the embodiment illustrated, module 62 includes speakers 64, microphones 66, and coder/decoder 68. Speaker 64 enables play out of audio, while microphone 66 enables input of audio. Coder/decoder 68 enables the conversion of audio to and from digital format. Thus, for example, coder/decoder 68 may receive an audio input stream from microphone 66 and convert this input stream into a digitized stream of information. Similarly, coder/decoder 68 may receive a digital stream of audio, convert this into an analog stream, and provide the analog audio for output by speaker 64. While not explicitly illustrated, user interface module 62 may include any number of other input and output mechanisms for interfacing with users. For example, user interface module 62 may include display screens, keypads, keyboards, and/or other appropriate interface mechanisms.

During operation, communication device 14 coordinates activities with other communication devices 14 to provide enhanced audio services. According to particular embodiments, communication device 14 responds to information provided by ASM device 12 to help provide conferencing services within a particular acoustic space 20. As previously discussed, communication device 14 may receive a media stream that includes any number of packets containing audio for output by speaker 64. In addition to this media stream, communication device 14 may receive one or more commands specifying times for playing out particularly identified packets. For example, embedded within an RTP portion of one of the media stream packets, there may be instructions indicating a particular time for playing out media from the packet. Alternatively, communication device 14 may receive a separate command packet, such as an RTCP, that specifies the timing command. To satisfy this timing command, controller 50 may take into account delays introduced by various audio processing algorithms and components, such as coder/decoder 68, to determine when to begin the process of playing out audio from the packet. By taking into account these particular delays introduced by components within communication device 14, controller 50 can ensure that the audio from the packet outputs from speaker 64 at or near the time specified for play out of audio from the packet.

To ensure that the play out time used by communication device 14 matches closely with other communication devices 14 within acoustic space 20, controller 50 may synchronize to a centralized clock. For example, communication devices 14 within acoustic space 20 may communicate with each other and/or with a central platform to synchronize to a single clock. According to particular embodiments, communication device 14 accesses a network time protocol server one or more times before and/or during a communication session to synchronize.

The elements of communication device 14 may also provide any number of other suitable services and functionality to support coordinated operation of multiple communication devices 14 within acoustic space 20. For example, user interface module 62 may support standardized volume outputs, automatic volume level detections, and/or other suitable mechanisms to enable leveling of volume among multiple communication devices 14. Network interface 52 may provide for monitoring and reporting of network conditions, such as packet loss, to other elements, such as to ASM device 12.

While the embodiment illustrated and the preceding description focus on a particular example of communication device 14 that includes specific elements providing particular functionalities, system 10 contemplates communication device 14 having any suitable combination and arrangement of elements that support coordination of the actions of communication device 14 with other communication devices 14 within acoustic space 20 to provide enhanced audio services. Thus, the functionalities performed by the particular elements illustrated may be separated or combined as appropriate, and functionalities of some or all of these elements may be implemented by logic encoded in media.

Figure 4:
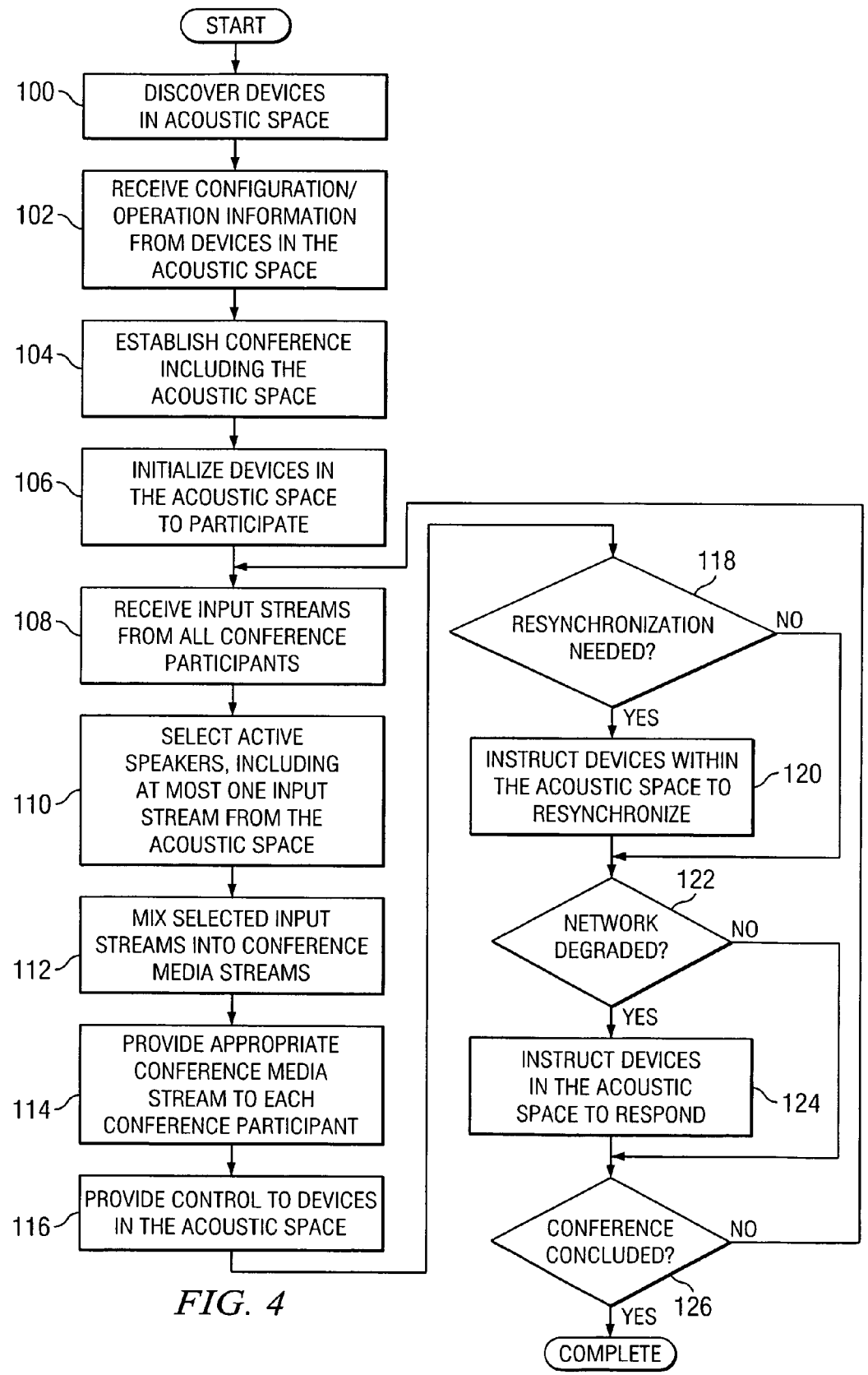
FIG. 4 is a flowchart illustrating a method for managing multiple packet-based telephony devices within an acoustic space to provide conferencing services.

FIG. 4 is a flowchart illustrating a method for coordinating operation of multiple communication devices 14 within a single acoustic space 20 to provide audio services. ASM device 12 discovers devices in an acoustic space at step 100. For example, ASM device 12 may receive configuration information provided by a system administrator. Alternatively or in addition, communication devices 14 may cooperate through audible signals and/or other appropriate techniques to discover which communication devices 14 may be grouped within a single acoustic space 20.

ASM device 12 receives configuration/operation information from communication devices 14 in the acoustic space 20 at step 102. For example, ASM device 12 may query each communication device 14 within acoustic space 20 for information such as device types, algorithmic delays, and/or other appropriate information. Using the various information discovered and/or determined, ASM device 12 can build an acoustic space management database for use in coordinating operations of communication devices 14 within acoustic space 20.

ASM device 12 establishes a conference including the acoustic space 20 at step 104. For example, ASM device 12 may detect a call placed to a network address indicating acoustic space 20. Alternatively, ASM device 12 may detect a call placed to one of communication devices 14 within acoustic space 20 requesting a conference. As an alternative, ASM device 12 may detect a request from one or more communication devices 14 within acoustic space 20 to provide conferencing services. Communication devices 14 may provide these requests before and/or during established communication sessions. Thus, for example, during an established communication session between one communication device 14 and another remote participant, communication device 14 may request for conferencing services using multiple communication devices 14 within acoustic space 20. However, as should be apparent from these examples, the particular method used to establish a conference can vary widely.

To establish a conference using multiple communication devices 14, ASM device 12 initializes communication devices 14 in acoustic space 20 at step 106. For example, ASM device 12 may instruct communication devices 14 to synchronize their clocks, level their volumes, establish multicast groups for distribution of packets and/or perform other suitable tasks to initialize. During the communication session, ASM device 12 receives input streams from conference participants at step 108. This potentially includes input streams from multiple communication devices 14 within acoustic space 20. ASM device 12 selects active speakers from among these input streams, including at most one input stream from acoustic space 20 at step 110. ASM device 12 mixes the selected input streams into conference media streams at step 112 and provides an appropriate conference media stream to each conference participant at step 114. For example, as previously discussed, ASM device 12 may provide a media stream to communication devices 14 that excludes any input received from communication devices 14.

In addition to providing conference media to communication devices 14, conference bridge also provides control to communication devices 14 in acoustic space 20 at step 16. For example, ASM device 12 may provide one or more commands during the communication session instructing communication devices 14 when to play out audio from particular packets. For example, ASM device 12 may supply a command that instructs communication devices 14 to play out a packet identified by a packet sequence number at a specified time. As previously discussed, ASM device 12 may take into account algorithmic delays introduced by some or all communication devices 14 within acoustic space 20. This enables each communication device 14 to meet the specified time for audio play out. If one or more communication devices 14 within acoustic space 20 specify algorithmic delays substantially longer than other communication devices 14, ASM device 12 may choose to exclude this communication device 14 from the conference. Also, if some communication devices 14 within acoustic space 20 begin experiencing problems such as severe network degradation, ASM device 12 may similarly exclude these communication devices 14 from a conference. Thus in these and other appropriate circumstances, ASM device 12 may instruct selected communication devices 14 to discontinue audio output, audio input, and/or to drop out of the conference.

During the conference, ASM device 12 may determine whether communication devices 14 need resynchronization at step 118. For example, ASM device 12 may monitor the clocks of communication devices 14 to determine when these clocks have reached a threshold of discordance. Alternatively or in addition, ASM device 12 may determine that resynchronization is needed after some predetermined period of time, such as every five minutes. If resynchronization is needed, ASM device 12 instructs communication devices 14 within acoustic space 20 to resynchronize at step 120.

During the conference, ASM device 12 may also monitor for network degradation at step 122. For example, as previously discussed, ASM device 12 may receive network status updates from communication devices 14. Upon detecting network degradation, ASM device 12 may instruct communication devices 14 to respond appropriately. For example, as previously discussed, some or all communication devices 14 may support acoustic echo cancellation using either full duplex or half duplex modes. In the event of network degradation, ASM device 12 may instruct some or all communication devices 14 to switch their acoustic echo cancellation schemes to half duplex operation. Additionally or alternatively, ASM device 12 may instruct communication devices 14 to discontinue some or all participation in the conference. This general process continues until completion of the conference at step 126.

The preceding flowchart and accompanying description illustrate a particular method for ASM device 12 and communication devices 14 to provide conferencing services using coordination of communication devices 14 within acoustic space 20. However, the preceding flowchart and accompanying description illustrate only an exemplary method of operation, and system 10 contemplates ASM device 12, communication devices 14, and/or other suitable components using any appropriate techniques to provide coordinated audio services within an acoustic space. Thus, many of the steps in this flowchart may take place simultaneously and/or in different orders than as shown. In addition, elements may use methods with additional steps, fewer steps, and/or different steps, so long as the methods remain appropriate. Moreover, while this flowchart and the entire description above focus primarily upon conference room applications, system 10 contemplates using these techniques to provide for coordination of packet-based audio devices to provide any suitable services, such as conferencing, paging, broadcasting, and other appropriate services.

Although the present invention has been described in several embodiments, a myriad of changes and modifications may be suggested by one skilled in the art, and it is intended that the present invention encompass such changes and modifications as fall within the scope of the present appended claims.

What is claimed is:

1. A method for coordinating operation of packet-based telephony devices comprising:
　discovering a plurality of packet-based telephony devices within an acoustic space;
　initializing the packet-based telephony devices to participate in a communication session for the exchange of packet-based audio communications between participants of the communication session;

generating an output stream comprising a plurality of packets each including digitally encoded audio;

calculating a time for play out of a selected one of the packets;

providing the output stream to the packet-based telephony devices; and commanding each of the packet-based telephony devices to output the audio from the selected packet at the calculated time.

2. The method of claim 1, wherein commanding the packet-based telephony devices to output the audio from the selected packet at the calculated time comprises embedding instructions within a field of the selected packet, the instructions specifying the calculated time.

3. The method of claim 1, wherein commanding the packet-based telephony devices to output the audio from the selected packet at the calculated time comprises:

generating a command packet separate from the output stream, the command packet identifying a sequence number of the selected packet and the calculated time; and communicating the command packet to the packet-based telephony devices.

4. The method of claim 1, wherein initializing the packet-based telephony devices to participate comprises commanding each of the packet-based telephony devices to synchronize clocks with a central network time server.

5. The method of claim 1, further comprising commanding each of the packet-based telephony devices to output audio at a particular volume level.

6. The method of claim 1, further comprising:

receiving a volume change indication from one of the packet-based telephony devices, the volume change indication specifying a volume level; and communicating a command to all other ones of the packet-based telephony devices, the command specifying the volume level.

7. The method of claim 1, further comprising:

receiving input streams from each of the packet-based telephony devices, each of the input streams comprising a plurality of packets each including digitally encoded audio;

selecting one of the input streams;

generating a second output stream using the selected input stream; and communicating the second output stream to participants in the communication session outside of the acoustic space.

8. The method of claim 1, further comprising:

determining an algorithmic delay for each of the packet-based telephony devices, the algorithmic delay indicating a time delay from receiving a packet to providing play out of audio from the received packet; and calculating the time for play out of the selected one of the packets based on the algorithmic delays from the packet-based telephony devices.

9. The method of claim 1, further comprising removing one of the packet-based telephony devices from the communication session before completion of the communication session based upon measured network conditions.

10. An apparatus for coordinating operation of packet-based telephony devices comprising:

an interface operable to communicate with a plurality of packet-based telephony devices within an acoustic space;

a media module operable to generate an output stream comprising a plurality of packets each including digitally encoded audio; and a controller operable to initialize the packet-based telephony devices to participate in a communication session for the exchange of packet-based audio communications between participants of the communication session, to calculate a time for play out of a selected one of the packets, to provide the output stream to the packet-based telephony devices, and to command each of the packet-based telephony devices to output the audio from the selected packet at the calculated time.

11. The apparatus of claim 10, wherein the controller is further operable to command the packet-based telephony devices to output the audio from the selected packet at the calculated time by embedding instructions within a field of the selected packet, the instructions specifying the calculated time.

12. The apparatus of claim 10, wherein the controller is further operable to command the packet-based telephony devices to output the audio from the selected packet at the calculated time by:

generating a command packet separate from the output stream, the command packet identifying a sequence number of the selected packet and the calculated time; and communicating the command packet to the packet-based telephony devices.

13. The apparatus of claim 10, where the controller is further operable to initialize the packet-based telephony devices to participate by commanding each of the packet-based telephony devices to synchronize clocks with a central network time server.

14. The apparatus of claim 10, wherein the controller is further operable to command each of the packet-based telephony devices to output audio at a particular volume level.

15. The apparatus of claim 10, wherein the controller is further operable to:

receive a volume change indication from one of the packet-based telephony devices, the volume change indication specifying a volume level; and communicate a command to all other ones of the packet-based telephony devices, the command specifying the volume level.

16. The apparatus of claim 10, wherein:

the interface is further operable to receive input streams from each of the packet-based telephony devices, each of the input streams comprising a plurality of packets each including digitally encoded audio;

the media module is further operable to select one of the input streams, to generate a second output stream using the selected input stream, and to communicate the second output stream to participants in the communication session outside of the acoustic space using the interface.

17. The apparatus of claim 10, wherein the controller is further operable to:

determine an algorithmic delay for each of the packet-based telephony devices, the algorithmic delay indicating a time delay from receiving a packet to providing play out of audio from the received packet; and calculate the time for play out of the selected one of the packets based on the algorithmic delays from the packet-based telephony devices.

18. The apparatus of claim 10, wherein the controller is further operable to remove one of the packet-based telephony devices from the communication session before completion of the communication session based upon measured network conditions.

19. Computer readable media encoding logic for coordinating operation of packet-based telephony devices, the logic encoded in media and operable when executed by an ASM device to:
discover a plurality of packet-based telephony devices within an acoustic space;
initialize the packet-based telephony devices to participate in a communication session for the exchange of packet-based audio communications between participants of the communication session;
generate an output stream comprising a plurality of packets each including digitally encoded audio;
calculate a time for play out of a selected one of the packets;
provide the output stream to the packet-based telephony devices; and
command each of the packet-based telephony devices to output the audio from the selected packet at the calculated time.

20. The computer readable media of claim 19, further operable to command the packet-based telephony devices to output the audio from the selected packet at the calculated time by embedding instructions within a field of the selected packet, the instructions specifying the calculated time.

21. The computer readable media of claim 19, further operable to command the packet-based telephony devices to output the audio from the selected packet at the calculated time by:
generating a command packet separate from the output stream, the command packet identifying a sequence number of the selected packet and the calculated time; and
communicating the command packet to the packet-based telephony devices.

22. The computer readable media of claim 19, wherein initializing the packet-based telephony devices to participate comprises commanding each of the packet-based telephony devices to synchronize clocks with a central network time server.

23. The computer readable media of claim 19, further operable to command each of the packet-based telephony devices to output audio at a particular volume level.

24. The computer readable media of claim 19, further operable to perform the steps of:
receiving a volume change indication from one of the packet-based telephony devices, the volume change indication specifying a volume level; and
communicating a command to all other ones of the packet-based telephony devices, the command specifying the volume level.

25. The computer readable media of claim 19, further operable to perform the steps of:
receiving input streams from each of the packet-based telephony devices, each of the input streams comprising a plurality of packets each including digitally encoded audio;
selecting one of the input streams;
generating a second output stream using the selected input stream; and
communicating the second output stream to participants in the communication session outside of the acoustic space.

26. The computer readable media of claim 19, further comprising:
determining an algorithmic delay for each of the packet-based telephony devices, the algorithmic delay indicating a time delay from receiving a packet to providing play out of audio from the received packet; and
calculating the time for play out of the selected one of the packets based on the algorithmic delays from the packet-based telephony devices.

27. The computer readable media of claim 19, further operable to remove one of the packet-based telephony devices from the communication session before completion of the communication session based upon measured network conditions.

28. An apparatus for coordinating operation of packet-based telephony devices comprising:
means for discovering a plurality of packet-based telephony devices within an acoustic space;
means for initializing the packet-based telephony devices to participate in a communication session for the exchange of packet-based audio communications between participants of the communication session;
means for generating an output stream comprising a plurality of packets each including digitally encoded audio;
means for calculating a time for play out of a selected one of the packets;
means for providing the output stream to the packet-based telephony devices; and
means for commanding each of the packet-based telephony devices to output the audio from the selected packet at the calculated time.

29. A method for coordinating operation of packet-based audio devices comprising:
discovering a plurality of packet-based audio devices within an acoustic space;
commanding each of the packet-based audio devices to synchronize clocks with a central network time server;
generating an output stream comprising a plurality of packets each including digitally encoded audio;
determining an algorithmic delay for each of the packet-based audio devices, the algorithmic delay indicating a time delay from receiving a packet to providing play out of audio from the received packet;
calculating a time for play out of a selected one of the packets based on the algorithmic delays from the packet-based audio devices;
providing the output stream to the packet-based audio devices;
commanding each of the packet-based audio devices to output the audio from the selected packet at the calculated time;
receiving input streams from each of the packet-based audio devices, each of the input streams comprising a plurality of packets each including digitally encoded audio;
selecting one of the input streams;
generating a second output stream using the selected input stream; and
communicating the second output stream to participants in the communication session outside of the acoustic space.

* * * * *